(12) United States Patent
Robinson

(10) Patent No.: US 10,661,295 B2
(45) Date of Patent: May 26, 2020

(54) PORTABLE PAINTING AND DRYING APPARATUSES

(71) Applicant: Kyle Robinson, Menlo Park, CA (US)

(72) Inventor: Kyle Robinson, Menlo Park, CA (US)

( * ) Notice: Subject to any disclaimer, the term of this patent is extended or adjusted under 35 U.S.C. 154(b) by 0 days.

(21) Appl. No.: 16/163,879

(22) Filed: Oct. 18, 2018

(65) Prior Publication Data

US 2020/0122179 A1   Apr. 23, 2020

(51) Int. Cl.
*B05B 13/02* (2006.01)
*B05C 13/02* (2006.01)
*B25H 1/04* (2006.01)
*B05C 13/00* (2006.01)
*B25H 1/00* (2006.01)
*F16M 11/00* (2006.01)

(52) U.S. Cl.
CPC .......... *B05B 13/0285* (2013.01); *B05C 13/00* (2013.01); *B05C 13/02* (2013.01); *B25H 1/0042* (2013.01); *B25H 1/0057* (2013.01); *B25H 1/04* (2013.01); *F16M 11/00* (2013.01); Y10S 269/905 (2013.01)

(58) Field of Classification Search
CPC ..... B05C 13/00; B05C 13/02; B05B 13/0285; B25H 1/00; B25H 1/0042; B25H 1/0057; B25H 1/04; F16M 11/00; Y10S 269/905

USPC ......................................................... 118/500
See application file for complete search history.

(56) References Cited

U.S. PATENT DOCUMENTS

| | | | | |
|---|---|---|---|---|
| 3,762,951 A * | 10/1973 | Hetznecker | ............. | B05B 5/082 134/16 |
| 5,660,637 A * | 8/1997 | Dodge | ................ | B05B 13/0285 118/500 |
| 7,121,418 B2 * | 10/2006 | Stier | ......................... | A47F 5/02 211/206 |
| 8,328,173 B1 * | 12/2012 | DesForge | ............. | B25H 1/0007 248/176.1 |
| 8,707,976 B2 * | 4/2014 | Bauer | ................ | B05B 13/0285 135/96 |

* cited by examiner

*Primary Examiner* — Laura Edwards

(57) ABSTRACT

Disclosed is a portable painting and drying apparatus for facilitating painting and drying of wooden blocks such as cabinet doors. The portable painting and drying apparatuses are formed using various components such as bases, poles (e.g., metallic poles and wooden dowels), joints (e.g., single and double-pole joints), a spinner, hangers, a spray gun holder, a hitch clip, a hanger organizer, a hitch clip holder, a rail connector, a rubber washer, or a thumb screw. The painting apparatus is used by a painter for painting all surfaces of a cabinet door at the same time. Upon completion of painting of the cabinet door, the painted cabinet door is transferred to the drying apparatus for drying.

10 Claims, 10 Drawing Sheets

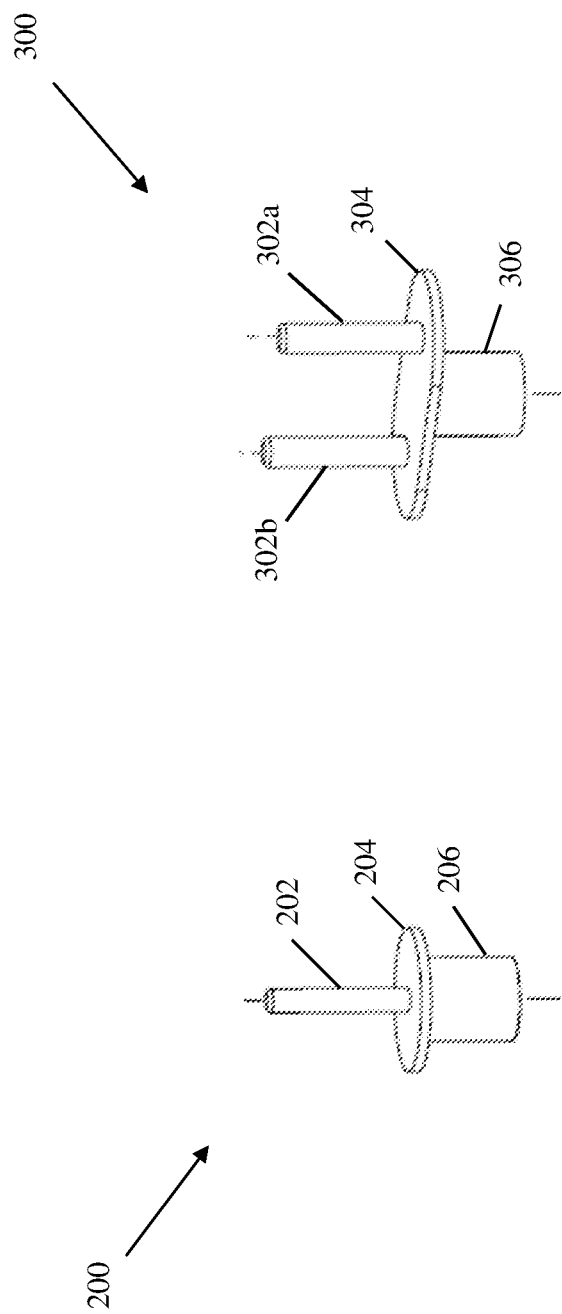

PORTABLE PAINTING AND DRYING APPARATUSES

FIELD OF THE INVENTION

The present invention relates generally to painting and drying tools, and, more particularly, to a portable painting apparatus for holding an object for painting and a portable drying apparatus for holding the painted object for drying.

BACKGROUND

Generally, during new construction or renovation of a house or office complex, a few doors to many dozen doors (or other wooden cabinets) needs to be painted and then dried before installation. Typically, each door is finished prior to being installed within the opening which the door will serve. Painting and drying of such doors or wooden cabinets is highly important but challenging at the same time as it requires a lot of man hours and space to complete painting and drying of the doors or wooden cabinets, which in turn increases the overall operation time and space required, which in turn increases the overall operation cost of painting, drying, and then installing the doors or wooden cabinets. Thus, commercial painters always look for various ways to improve the overall process of painting and drying the doors or wooden cabinet doors during new construction or renovation. Most of the time, painting is done by spraying each door whiles it's being held horizontally or vertically.

In a scenario where a door is held horizontally, the door is placed on a table or a stand. Thereafter, in its horizontal position, the door is painted and then left to dry. Typically, the door is flipped to paint the other side once sufficiently dry. If the vertical method is chosen, the door is held in a way that enables the painter to finish painting of all surfaces of the door at the same time. Once painting of the door is complete, the painted door is transferred to a hanging area to dry. A common practice is to use cup-holder hooks that are drilled into the least visible edge of the door and then hang the door on a common wooden hanger. The hanger is then placed on a pipe structure, often of PVC pipe, for the spraying process in which the painter sprays all surfaces of the door and then transfers the painted door to a drying area at the job site. The drying area is often made up of extension ladders supported by step ladders.

There are few drawbacks to this typical configuration of the vertical painting. For example, the hooks of the wooden hanger can sometimes fail if the cabinet door is too heavy, and thus can potentially damage the door and require rework. Also, the painter must reach into the spraying area to turn the part to the surface that the painter wishes to spray. Furthermore, the hook spins freely in relation to the wooden hanger which allows the part to unwantedly spin when overpowered by the force of the spray and requires extra care when placing in the drying area to prevent doors from rotating and touching with each other that can otherwise contaminate an adjacent door. Further, if the hooks in the door are not properly spaced, the door can slip on the hanger. In light of the foregoing, there exists a need for a technical and more reliable solution that solves the above-mentioned problems and provides a portable painting apparatus for holding an object for painting and a portable drying apparatus for holding the painted object for drying in an effective and efficient manner.

BRIEF SUMMARY

It is an objective of the present invention to provide a portable painting and drying architecture for facilitating painting and drying of wooden blocks such as cabinet doors. The portable painting and drying architectures are formed using various components such as bases, poles (e.g., metallic poles and wooden dowels), joints (e.g., single and double-pole joints), a spinner, hangers, a spray gun holder, a hitch clip, a hanger organizer, a hitch clip holder, a rail connector, a rubber washer, and a thumb screw.

The portable painting and drying architectures have two arrangements, one is a spraying arrangement (such as a painting apparatus) and other one is a drying arrangement (such as a drying apparatus). Height and width of each of the spraying and drying arrangements may be adjusted as per the shape and size of a cabinet door that needs to be painted by a painter. Furthermore, the drying arrangement may be arranged in various ways to ensure that a hanging area conforms to the available space. For example, the drying arrangement may be arranged in straight line, 90 degree, or other angles for each 6' section. Additional sections can be added as required. Interchangeable parts ensure quick and error free assembly and hence easy to carry from one place to another.

Each cabinet door is fixed with two common cup-holder hooks with standardized spacing (e.g., 10") that provides better trapping of the door and prevents slipping of the door cabinet while on a hanger. After placing the cabinet door on the hanger, the hanger is placed in a slot of the spinner of the painting arrangement. The spinning assembly (formed using the spinner, wooden dowels, hitch clip, hitch clip holder, rail connector, and rubber washer) holds the hanger tightly in the slot and allows the cabinet door to spin based on spinning of the spinner by the painter by means of the wooden dowels. The design of a spinning connection allows the painter to control any associated drag of the spinning part, thereby ensuring that the cabinet door remains at the same place without much movement. The painter can use the wooden dowels to spin the cabinet door as per the painting requirement without reaching into the spraying area. Upon completion of painting of the cabinet door, the painter (or some other individual) removes the painted cabinet door from the slot of the spinner of the painting arrangement, and then places the painted cabinet door on the drying arrangement for drying. The radius of the hanger hook is matched to the radius of the drying poles of the drying arrangement that helps to minimize any rotation of the hanging part, and hence allowing tighter spacing of drying parts.

In one embodiment of the present invention, the painting arrangement such as the painting apparatus includes a plurality of bases. Each base has a vertical section having a hollow portion therein and a plurality of legs. One end of each of the plurality of legs is attached to the vertical section at an angle such that the one end is at a higher position than other end of each of the plurality of legs. The painting apparatus further includes a plurality of first poles. Each first pole is vertically inserted into the hollow portion of the vertical section of each base. The painting apparatus further includes a plurality of single-pole joints. Each single-pole joint is removably inserted into each first pole such that a single pole of each single-pole joint is outside each first pole. The painting apparatus further includes a second pole having a plurality of openings including at least first, second, and third openings. The second opening is at a center of the second pole. The first and third openings are at equal distance from the second opening. Also, the second pole is horizontally placed over the plurality of first poles such that the first and third openings are removably inserted into single poles of the plurality of single pole joints.

The painting apparatus further includes a spinning assembly. The spinning assembly includes a spinner having a plurality of horizontal sections and a vertical section. The vertical section is vertically inserted into the second opening of the second pole from bottom and is removably fixed from top by using a hitch clip assembly. Further, at least one of the horizontal sections includes one or more slots. The spinning assembly further includes a plurality of dowels that facilitate spinning of the spinner. The plurality of dowels are removably inserted into the hollow portion of each horizontal section of the spinner such that a first portion of each dowel is inside the hollow portion and a second portion of each dowel is outside the hollow portion. The painter uses the second portion for spinning the spinner. The spinning assembly further includes a removable hanger for holding an object (e.g., the cabinet door) by means of a plurality of hooks. The plurality of hooks are removably fixed to the object. The hanger with the object is mounted or hanged in one of the one or more slots for performing painting of the object by the painter using a paint sprayer. The spinning assembly holds the hanger tightly in one of the one or more slots so that the cabinet door spins when the spinner spins. Furthermore, design of the spinning connection allows the painter to control the drag of a spinning part (i.e., the cabinet door doesn't spin away from the painter from the power of the spray being injected by the paint sprayer).

These and other features and advantages along with other embodiments of the present invention will become apparent from the detailed description below, in light of the accompanying drawings.

BRIEF DESCRIPTION OF THE ACCOMPANYING DRAWINGS

The novel features which are believed to be characteristic of the present disclosure, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this disclosure will now be described by way of example in association with the accompanying drawings in which:

FIG. 2 shows a single-pole joint of the painting apparatus, in accordance with an embodiment of the present invention;

FIG. 3 shows a double-pole joint of the drying apparatus, in accordance with an embodiment of the present invention;

Figure 1:
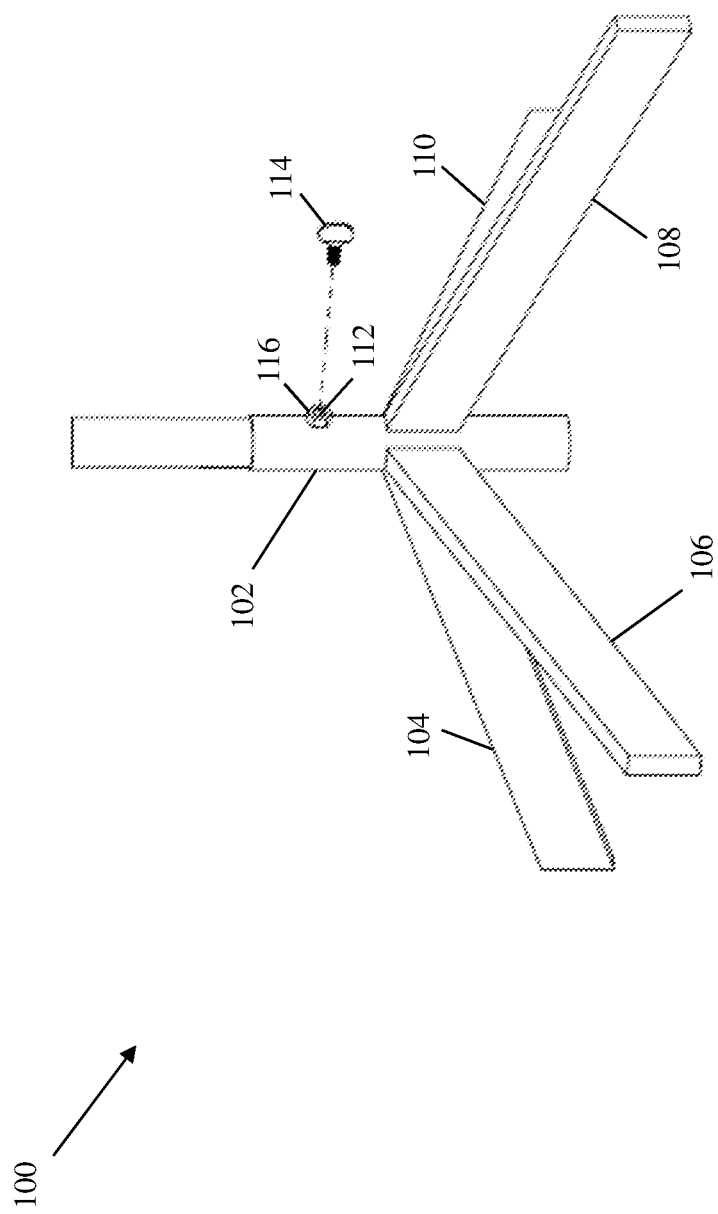
FIG. 1 shows a base assembly of a painting or drying apparatus, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of mechanical components, which constitutes a portable painting apparatus for holding an object for painting and a portable drying apparatus for holding the painted object for drying. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items.

Techniques consistent with the present invention provide, among other features, the portable painting and drying apparatuses for facilitating painting of a cabinet door and thereafter drying of the painted object. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

The portable painting and drying apparatuses will now be described with reference to the accompanying drawings which should be regarded as merely illustrative without restricting the scope and ambit of the disclosure.

FIG. 1 shows a base assembly 100 of a painting or drying apparatus, in accordance with an embodiment of the present invention. The base assembly 100 includes a vertical section 102 having a hollow portion therein and a plurality of legs such as legs 104-110. The plurality of legs such as the legs 104-110 are attached to the vertical section 102 to form the base assembly 100. One end of each of the plurality of legs such as the legs 104-110 is attached to the vertical section 102 at an angle such that the one end is at a higher, position than other end of each of the plurality of legs such as the legs 104-110. The vertical section 102 includes an opening 112. A pole is removably fixed to the vertical section 102 from the top by using a screw nut bolt assembly (such as a screw 114 and a nut bolt 116) through at least the opening 112.

FIG. 2 shows a single-pole joint 200 of the painting apparatus, in accordance with an embodiment of the present invention. The single-pole joint 200 includes a single pole 202, a joint base 204, and a cylindrical support 206. In one example, the single pole 202 and the cylindrical support 206 may have a metallic lateral surface with a hollow portion therein. In another example, the single pole 202 and the cylindrical support 206 may have a metallic lateral surface with solid filling therein. The joint base 204 may be a circular, oval, square, or rectangular metallic plate. The single pole 202 and the cylindrical support 206 are attached to the joint base 204, as shown, to form the single-pole joint 200. The single-pole joint 200 may be used for joining, attaching, or connecting two poles.

FIG. 3 shows a double-pole joint 300 of the drying apparatus, in accordance with an embodiment of the present invention. The double-pole joint 300 includes two poles 302a and 302b, a joint base 304, and a cylindrical support 306. In one example, each of the two poles 302a and 302b and the cylindrical support 306 may have a metallic lateral surface with a hollow portion therein. In another example, each of the two poles 302a and 302b and the cylindrical support 306 may have a metallic lateral surface with solid filling therein. The joint base 304 may be a circular, oval, square, or rectangular metallic plate. The two poles 302a and 302b and the cylindrical support 306 are attached to the joint base 304, as shown, to form the double-pole joint 300. The double-pole joint 300 may be used for joining, attaching, or connecting at least three poles.

Figure 4:
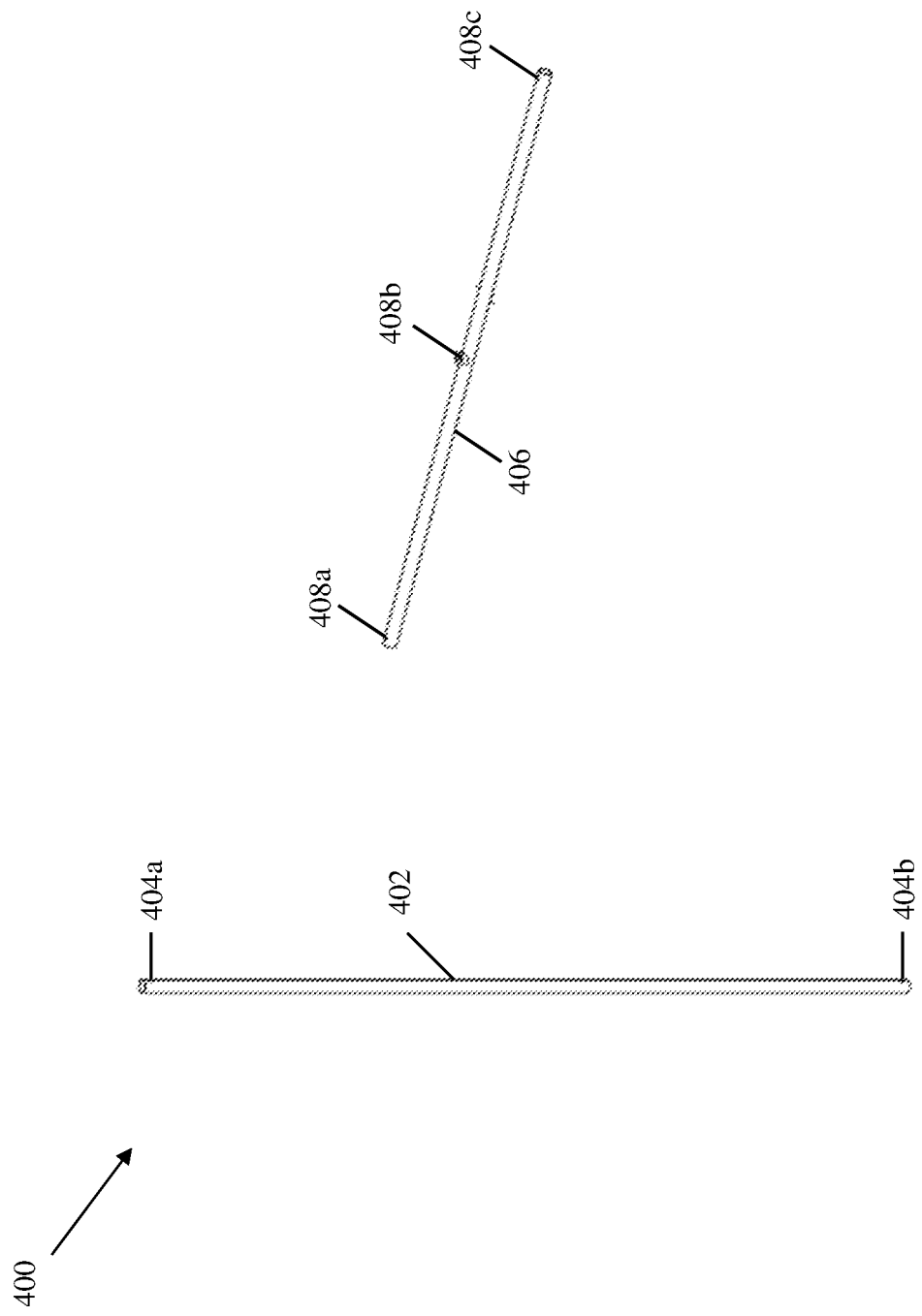
FIG. 4 shows poles of the painting or drying apparatus, in accordance with an embodiment of the present invention.

FIG. 4 shows various types of poles 400 of the painting or drying apparatus, in accordance with an embodiment of the present invention. For example, the various types of poles 400 includes a first pole 402. The first pole 402 is a long, slender, rounded, cylindrical piece of wood or metal. The first pole 402 includes a plurality of openings (e.g., see-through horizontal openings) such as openings 404a and 404b. The various types of poles 400 also includes a second pole 406. The second pole 406 is a long, slender, rounded, cylindrical piece of wood or metal. The second pole 406 includes a plurality of openings (e.g., see-through horizontal openings) such as openings 408a, 408b, and 408c. The opening 408b is at a center of the second pole 406, and the openings 408a and 408c are at equal distance from the opening 408b. For example, the openings 408a and 408c are opposite to each other and at equal distance from the opening 408b, as shown.

Figure 5:
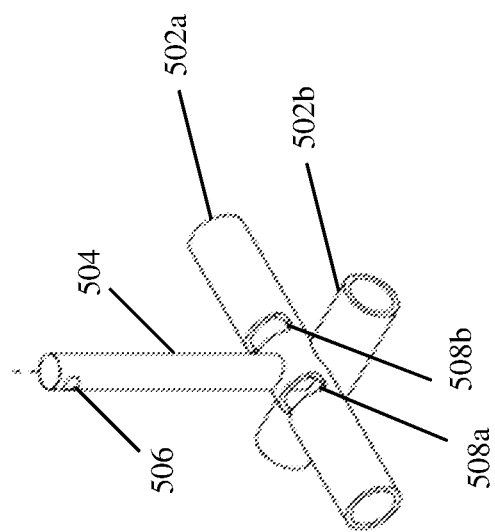
FIG. 5 shows a spinner of the painting apparatus, in accordance with an embodiment of the present invention.

FIG. 5 shows a spinner 500 of the painting apparatus, in accordance with an embodiment of the present invention. The spinner 500 includes a plurality of sections such as horizontal sections 502a and 502b and a vertical section 504. The plurality of sections are small, slender, rounded, cylindrical piece of metal. Further, each of the plurality of sections includes an hollow portion therein.

Further, the horizontal sections 502a and 502b and the vertical section 504 are joined or connected together to form the spinner 500. For example, the horizontal sections 502a and 502b are joined or connected together at a right angle, as shown in FIG. 5. Thereafter, the vertical section 504 is vertically joined or connected over one of the horizontal sections 502a and 502b to form the spinner 500. In an embodiment, at least one of the horizontal sections 502a and 502b includes one or more slots such as slots 508a and 508b. Furthermore, the vertical section 504 includes an opening 506 (e.g., see-through horizontal openings).

Figure 6:
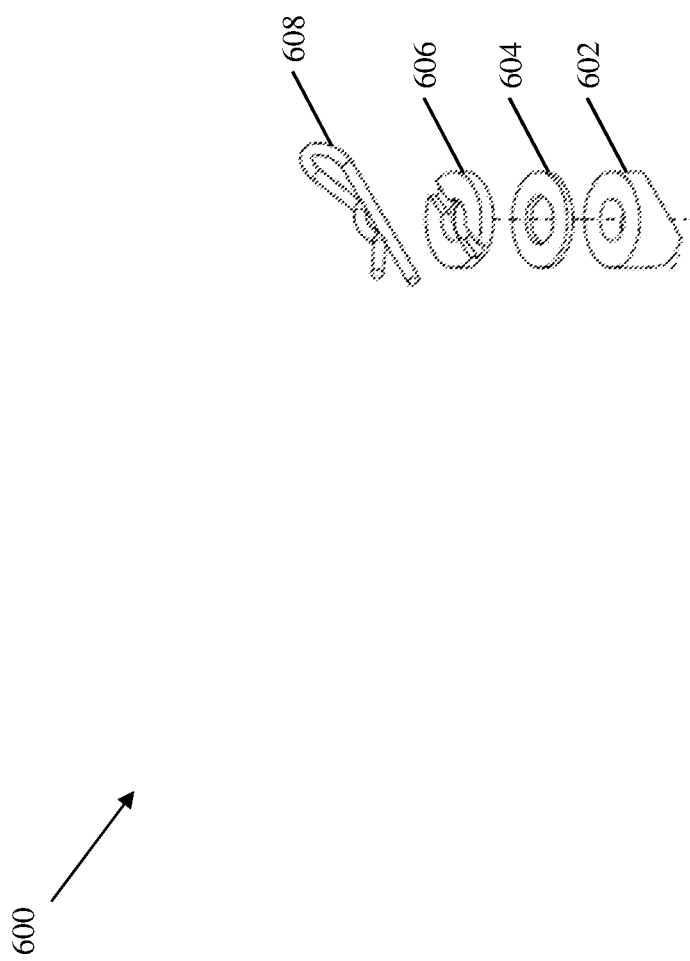
FIG. 6 shows a hitch-clip assembly of the painting apparatus, in accordance with an embodiment of the present invention.

FIG. 6 shows a hitch-clip assembly 600 of the painting apparatus, in accordance with an embodiment of the present invention. The hitch clip assembly 600 includes a rail connector 602, a rubber washer 604, a hitch clip holder 606, and a hitch clip 608, as shown in FIG. 6. In an exemplary embodiment, the vertical section 504 of the spinner 500 is vertically inserted into the opening 408b of the pole 406 from its bottom and is removably fixed from top by using the hitch clip assembly 600. The hitch clip assembly 600 is used through the opening 506 of the vertical section 504 of the spinner 500.

Figure 7:
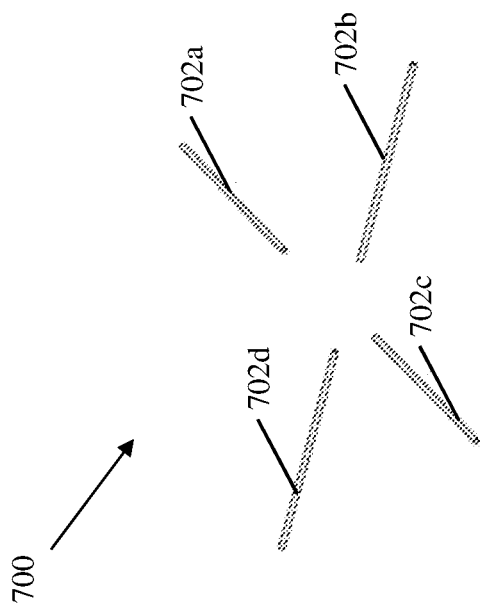
FIG. 7 shows a dowel set of the painting apparatus, in accordance with an embodiment of the present invention.
Figure 11:
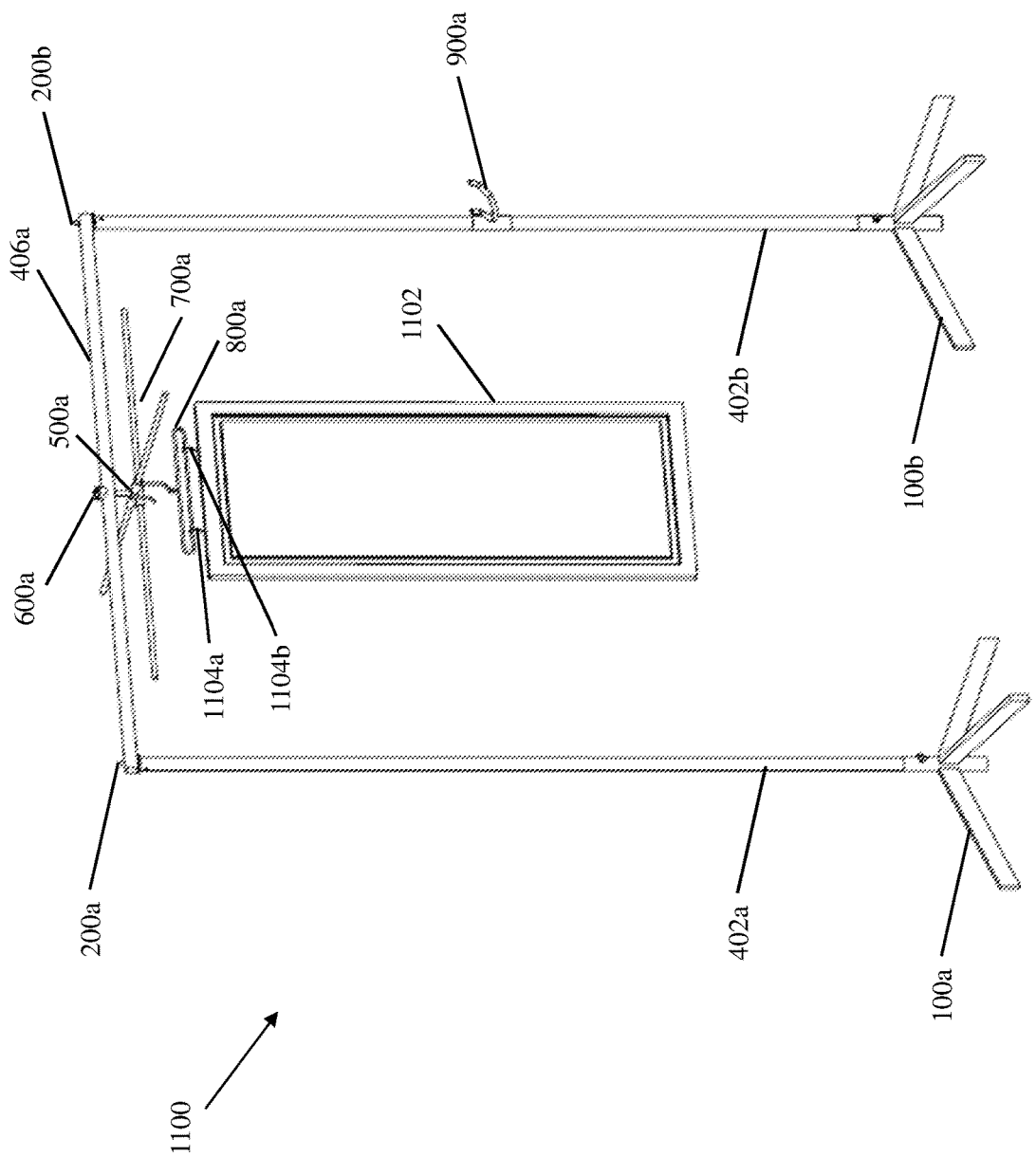
FIG. 11 shows the painting apparatus having the object hanging therein for painting, in accordance with an embodiment of the present invention.

FIG. 7 shows a dowel set 700 of the painting apparatus, in accordance with an embodiment of the present invention. The dowel set 700 includes a plurality of dowels such as dowels 702a-702d. Each dowel is a small, slender, rounded, cylindrical piece of wooden or metal that is used by a painter to spin the spinner 500, when the painter is using the painting apparatus in its compete set up for painting an object such as a door cabinet (the complete set up of the painting apparatus is shown in FIG. 11). In an exemplary embodiment, a dowel 702a, 702b, 702c, or 702d is removably inserted into the hollow portion of each horizontal section 502a or 502b of the spinner 500 such that a first portion of each dowel 702a, 702b, 702c, or 702d is inside the hollow portion and a second portion of each dowel 702a, 702b, 702c, or 702d is outside the hollow portion. With such arrangement, the painter can use the second portion of each dowel 702a, 702b, 702c, or 702d for spinning the spinner 500, which in turn facilitates spinning of the object and thereby assisting the painter to perform painting of all the surfaces of the object.

Figure 8:
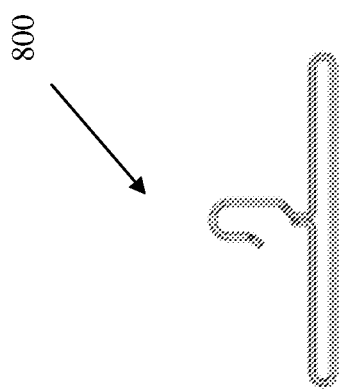
FIG. 8 shows a hanger for hanging an object on the painting apparatus, in accordance with an embodiment of the present invention.

FIG. 8 shows a hanger 800 for hanging the object on the painting apparatus, in accordance with an embodiment of the present invention. Firstly, the painter may insert a plurality of hooks (e.g., cup-holder hooks) that are drilled into the least visible edge or parts the object. Thereafter, the painter hangs the object on to the hanger 800 by means of the plurality of hooks, and thereafter, the painter places (i.e., removably fixes) the hanger with the hanging object (to be painted) in one of the slots 508a and 508b of the horizontal section 502a or 502b of the spinner 500. After placing the hanger with the hanging object in one of the slots 508a and 508b of the spinner 500 of the painting apparatus, the painter can use a paint sprayer for painting the object. Furthermore, the painter can use one of the dowels 702a, 702b, 702c, and 702d for spinning the spinner 500, which in turn assists the painter to perform painting of all the surfaces of the object at the same time. In an embodiment, a radius of a hanger hook of the hanger 800 is matched to a radius of drying poles of the drying apparatus. Such matching helps to minimize any rotation of the hanging part, and hence allowing tighter spacing of drying parts.

Figure 9:
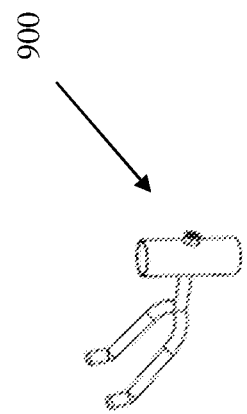
FIG. 9 shows a spray gun holder for holding a paint sprayer for painting the object, in accordance with an embodiment of the present invention.

FIG. 9 shows a spray gun holder 900 for holding the paint sprayer for painting the object, in accordance with an embodiment of the present invention. The spray gun holder 900 may be removably fixed to one of the various types of poles 400 such as the first pole 402. For facilitating such arrangement (i.e., the spray gun holder 900) for holding the paint sprayer, the first pole 402 may also include an opening (such as the opening 408b of the second pole 406) around which the spray gun holder 900 is removably fixed by means of a screw nut bolt assembly.

Figure 10:
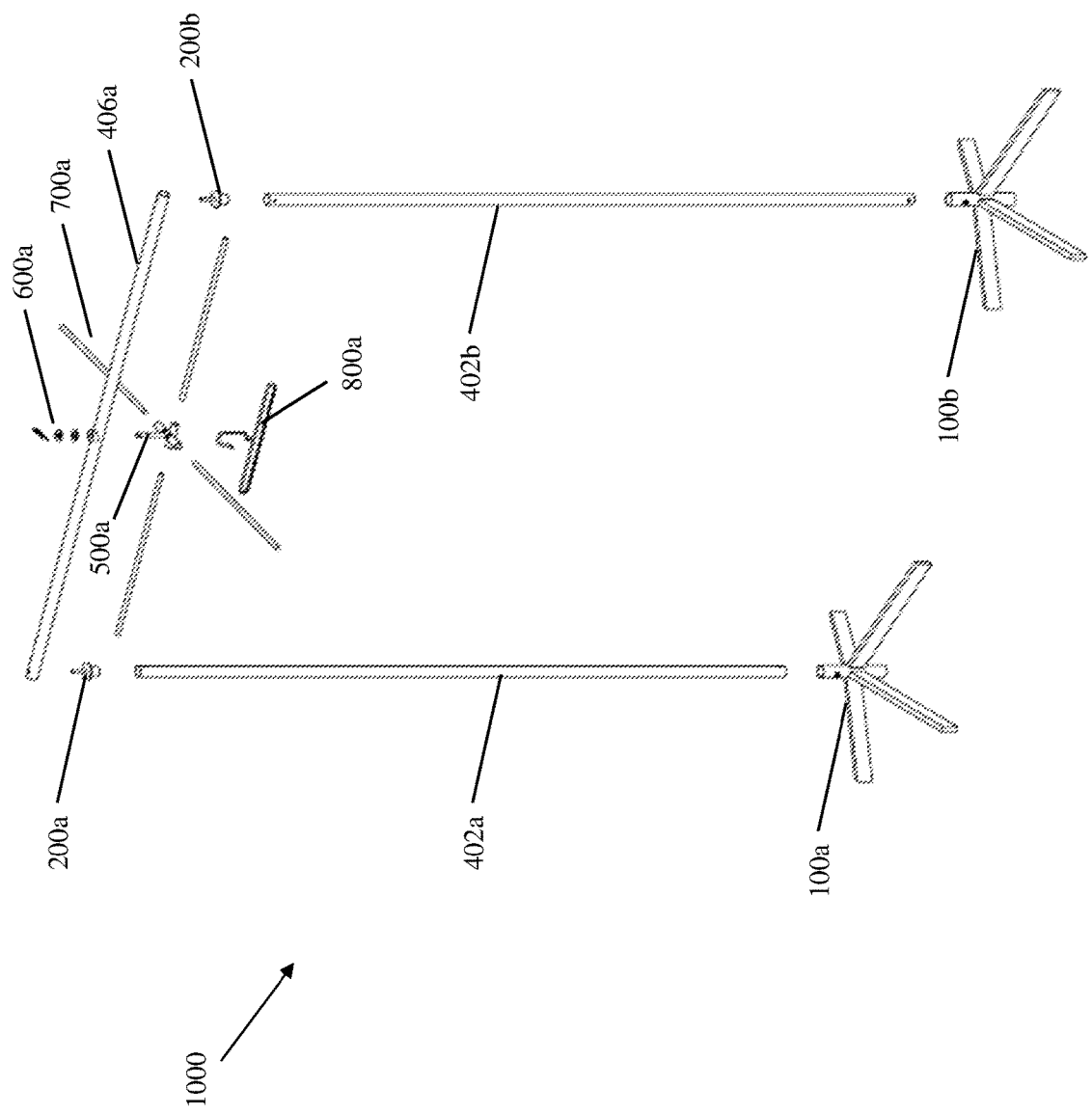
FIG. 10 shows an exploded view of the painting apparatus, in accordance with an embodiment of the present invention.

FIG. 10 shows an exploded view 1000 of the painting apparatus, in accordance with an embodiment of the present invention. The exploded view 1000 of the painting apparatus shows various components such as a plurality of bases 100a and 100b (such as the base 100 shown in FIG. 1), a plurality of single-pole joints 200a and 200b (such as the single-pole joint 200 shown in FIG. 2), a plurality of first poles 402a and 402b (such as the first pole 402 shown in FIG. 4), a second pole 406a (such as the second pole 406 shown in FIG. 4), a spinner 500a (such as the spinner 500 shown in FIG. 5), a hitch clip assembly 600a (such as the hitch clip assembly 600 shown in FIG. 6), a dowel set 700a including a plurality of dowels (such as the dowel set 700 shown in FIG. 7), and a hanger 800a (such as the hanger 800 shown in FIG. 8). The various components (as shown in FIG. 10) are assembled together to form the painting apparatus 1100 (as shown in FIG. 11).

In an embodiment, each of the first poles 402a and 402b are vertically inserted from the top into a hollow portion of a vertical section (such as the vertical section 102) of each of the bases 100a and 100b, respectively. Each of the first poles 402a and 402b is removably fixed to the vertical section of each of the bases 100a and 100b by using the screw nut bolt assembly (such as the screw 114 and a nut bolt 116) through the opening 112 and the opening 404b. Thereafter, the single-pole joints 200a and 200b are removably inserted into the first poles 402a and 402b, respectively, such that a single pole (such as the single pole 202) of each single-pole joint 200a or 200b is outside each first pole 402a or 402b, respectively. Joints bases (such as the joint base 204) of the single-pole joints 200a and 200b covers the top layer of the first poles 402a and 402b, respectively, and do not allow the single-pole joints 200a and 200b to completely immerse into the first poles 402a and 402b. With such assembly, only cylindrical supports (such as cylindrical support 206) of the single-pole joints 200a and 200b will be inside the first poles 402a and 402b.

Thereafter, the second pole 406a is horizontally placed over the first poles 402a and 402b such that openings (such as the openings 408a and 408c) of the second pole 406a are removably inserted into the single poles of the single-pole joints 200a and 200b. Thereafter, a vertical section (such as the vertical section 504) of the spinner 500a is vertically inserted into an opening (such as the opening 408b) of the second pole 406a from the bottom and is removably fixed from top by using the hitch clip assembly 600a. Further, each of the plurality of dowels of the dowel set 700a is removably inserted into an hollow portion of each horizontal section (such as the horizontal sections 502a and 502b) of the spinner 500a such that a first portion of each dowel is inside the hollow portion and a second portion of each dowel is outside the hollow portion. By following the above procedures of assembling the various components, the painting apparatus 1100 can be obtained, as shown in FIG. 11.

Further, an object 1102 (e.g., the cabinet doors) is hanged on to the hanger 800a by means of the plurality of hooks such as hooks 1104a and 1104b, as shown in FIG. 11. Thereafter, the hanger 800a with the hanging object 1102 is placed into a slot (such as the slot 508a or 508b) of the horizontal section of the spinner 500a, as shown in FIG. 11. In other way round, the hanger 800a may be first placed into the slot of the spinner 500a, and thereafter, the object 1102 is hanged on to the hanger 800a by means of the hooks 1104a and 1104b, as shown in FIG. 11.

Figure 12:
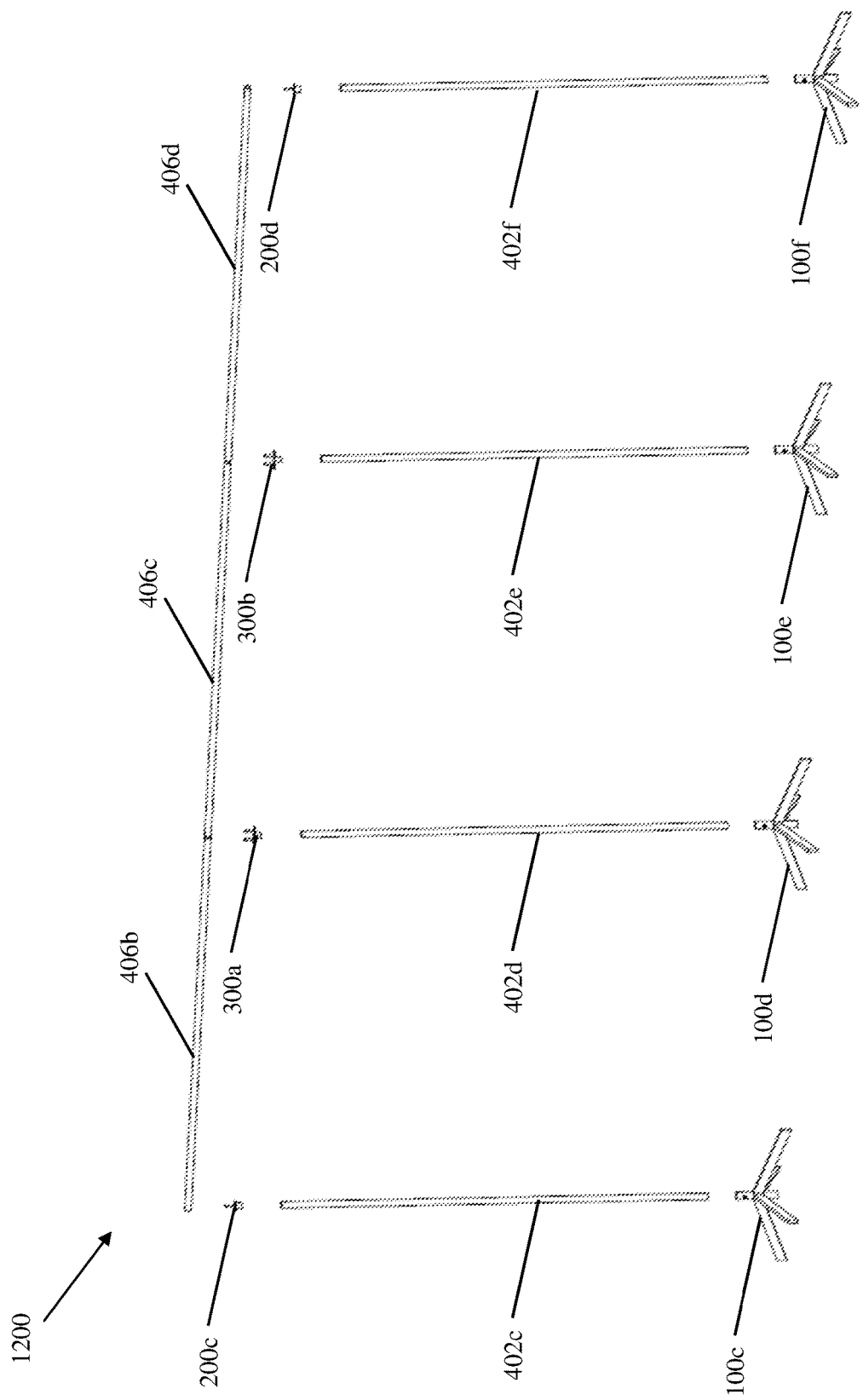
FIG. 12 shows an exploded view of the drying apparatus, in accordance with an embodiment of the present invention.

FIG. 12 shows an exploded view 1200 of the drying apparatus, in accordance with an embodiment of the present invention. The exploded view 1200 of the drying apparatus shows various components such as a plurality of bases 100c-100f (such as the base 100 shown in FIG. 1), a plurality of single-pole joints 200c and 200d (such as the single-pole joint 200 shown in FIG. 2), a plurality of double-pole joints 300a and 300b (such as the double-pole joint 300 shown in FIG. 3), a plurality of first poles 402c-402f (such as the first pole 402 shown in FIG. 4), and a plurality of second poles 406b-406d (such as the first pole 402 or the second pole 406 shown in FIG. 4). The various components (as shown in FIG. 12) are assembled together to form the drying apparatus 1300 (as shown in FIG. 13).

In an embodiment, each of the first poles 402c-402f are vertically inserted from the top into a hollow portion of a vertical section (such as the vertical section 102) of each of the bases 100c-100b, respectively. Each of the first poles 402c-402f is removably fixed to the vertical section of each of the bases 100c-100f by using the screw nut bolt assembly (such as the screw 114 and a nut bolt 116) as described above. Thereafter, the single-pole joints 200c and 200d are removably inserted into the first poles 402c and 402f, respectively, such that a single pole (such as the single pole 202) of each single-pole joint 200c or 200d is outside each first pole 402c or 402f, respectively. Joints bases (such as the joint base 204) of the single-pole joints 200c and 200d cover the top layer of the first poles 402c and 402f, respectively, and do not allow the single-pole joints 200c and 200d to completely immerse into the first poles 402c and 402f. With such assembly, only cylindrical supports (such as cylindrical support 206) of the single-pole joints 200c and 200d will be inside the first poles 402c and 402f. Similarly, the double-pole joints 300a and 300b are removably inserted into the first poles 402d and 402e, respectively, such that double poles (such as the two poles 302a and 302b) of each double-pole joint 300a or 300b is outside each first pole 402d or 402e, respectively. Joints bases (such as the joint base 304) of the double-pole joints 300a and 300b cover the top layer of the first poles 402d and 402e, respectively, and do not allow the double-pole joints 300a and 300b to completely immerse into the first poles 402d and 402e. With such assembly, only cylindrical supports (such as cylindrical support 306) of the double-pole joints 300a and 300b will be inside the first poles 402d and 402e.

Figure 13:
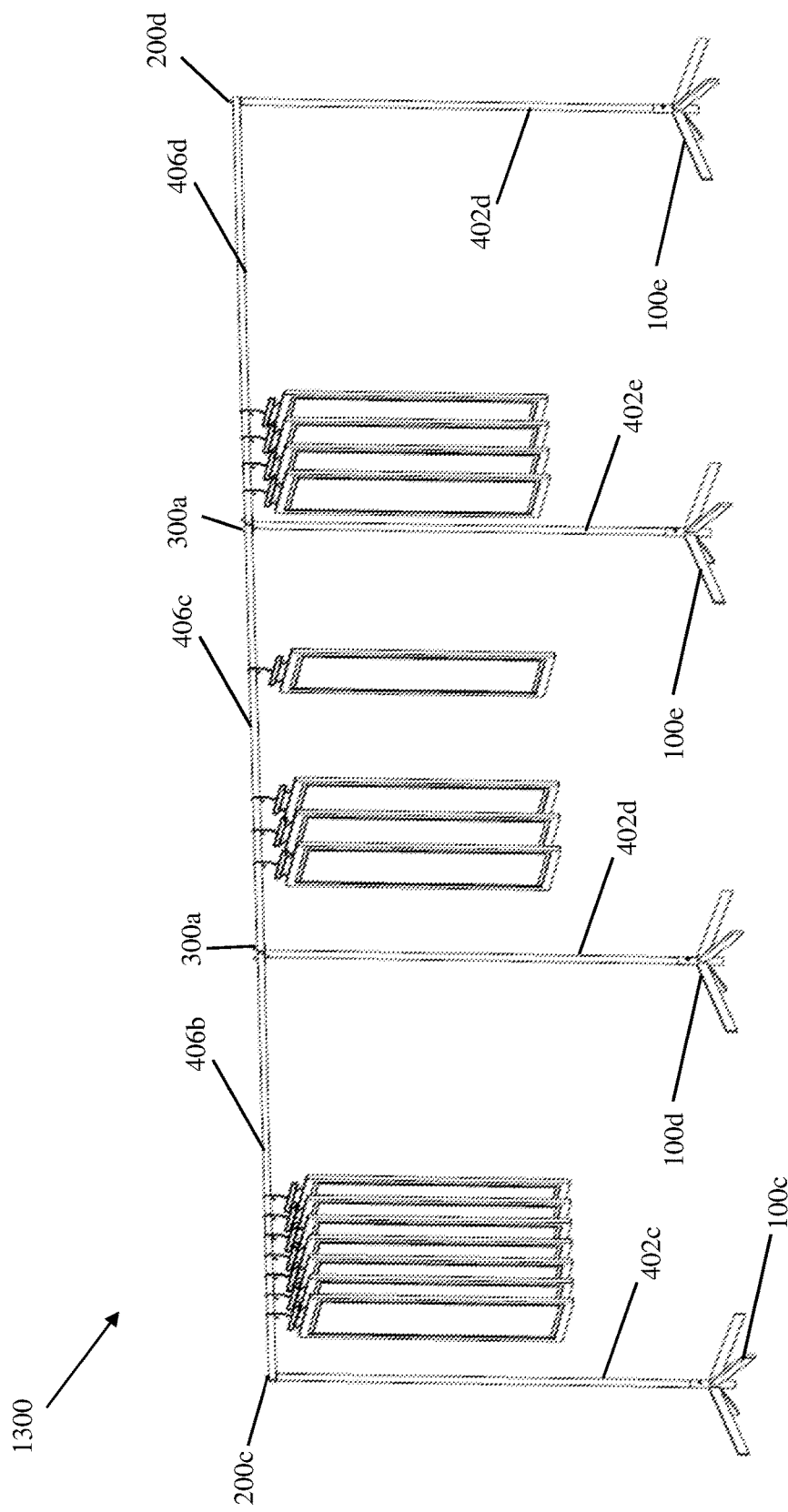
FIG. 13 shows the drying apparatus having the painted object hanging therein for drying, in accordance with an embodiment of the present invention.

Thereafter, each of the second poles 406b, 406c, and 406d (i.e., drying poles used for drying painted objects) is horizontally placed over the first poles 402c and 402d, 402d and 402e, and 402e and 402f, respectively, by means of the respective single-pole joints 200c and 200d and double-pole joints 300a and 300b, as shown in FIG. 13. By following the above procedures of assembling the various components, the drying apparatus 1300 can be obtained, as shown in FIG. 13. Further, various painted objects (such as the painted object 1102 shown in FIG. 11) may be placed along the second poles 406b, 406c, and 406d by means of various hangers (such as the hanger 800a shown in FIG. 11) and then left for drying. Furthermore, to make the optimal utilization of the available space for drying, a set of at least one base (such as the base 100d), one first pole (such as the first pole 402d), and one second pole (such as the second pole 406c) is rotatable along a double-pole joint (such as the double-point joint 300a).

Although the present invention has been described with respect to the painting apparatus 1100 and the drying apparatus 1300, it should be understood that the proposed painting apparatus 1100 and drying apparatus 1300 can be formed with varying shapes and sizes, and thus the disclosure here should not be considered limited to the exemplary embodiments and processes described herein. The various dimensions may be modified to fit in specific application areas.

Although particular embodiments of the invention have been described in detail for purposes of illustration, various modifications and enhancements may be made without departing from the spirit and scope of the invention.

What is claimed is:

1. A painting apparatus, comprising:
    a plurality of bases, each base comprising a vertical section having a hollow portion therein and a plurality of legs, wherein one end of each of the plurality of legs is attached to the vertical section at an angle such that the one end is at a higher position than other end of each of the plurality of legs;
    a plurality of first poles, wherein each first pole is vertically inserted into the hollow portion of the vertical section of each base;
    a plurality of single-pole joints, wherein each single-pole joint is removably inserted into each first pole such that a single pole of each single-pole joint is outside each first pole;
    a second pole having a plurality of openings including at least first, second, and third openings that are see-through horizontal openings, wherein the second opening is at a center of the second pole, and the first and third openings are at equal distance from the second opening and are located at a first end and a second end of the second pole, wherein the second pole is horizontally placed over the plurality of first poles such that the first and third openings are removably inserted into single poles of the plurality of single-pole joints associated with the plurality of first poles;
    a spinning assembly comprising:
    a spinner having a plurality of horizontal sections including at least a first horizontal section and a second horizontal section and a vertical section, wherein the first horizontal section and the second horizontal section are connected together at a right angle, and the vertical section is vertically connected to the second horizontal section from top, wherein the vertical section is vertically inserted into the second opening of the second pole from bottom and is removably fixed from top by using a hitch clip assembly, wherein the second horizontal section includes a first slot and a second slot, and wherein the vertical section is vertically connected to the second horizontal section between the first slot and the second slot; and
    a plurality of dowels that facilitate spinning of the spinner; and
    a hanger for holding an object, wherein the hanger with the object is mounted in one of the first or second slot for performing painting of the object using a paint sprayer.

2. The painting apparatus of claim 1, wherein the plurality of legs are attached to the vertical section to form each base, and wherein the vertical section includes a fourth opening.

3. The painting apparatus of claim 2, wherein each of the plurality of first poles includes at least a fifth opening, and wherein each first pole is removably fixed to the vertical section of each base by using a screw nut bolt assembly through the fourth opening and the fifth opening, and wherein the fourth opening and the fifth opening are see-through horizontal openings.

4. The painting apparatus of claim 3, wherein the hitch clip assembly includes a rail connector, a rubber washer, a hitch clip holder, and a hitch clip, and wherein the hitch clip assembly is used through a sixth opening of the vertical section of the spinner, and wherein an order of using the hitch clip assembly includes the rail connector, followed by the rubber washer, the hitch clip holder, and the hitch clip.

5. The painting apparatus of claim 1, wherein each section of the spinner includes a hollow portion therein.

6. The painting apparatus of claim 5, wherein each of the plurality of dowels including at least first, second, third, and fourth dowels is removably inserted into the hollow portion of each horizontal section of the spinner such that a first portion of each dowel is inside the hollow portion and a second portion of each dowel is outside the hollow portion, and wherein the second portion of each dowel is used for spinning the spinner.

7. The painting apparatus of claim 1, further comprising a spray holder for holding the paint sprayer, wherein the spray holder is removably fixed to one of the plurality of first poles by using a screw nut bolt assembly.

8. The painting apparatus of claim 1, wherein each dowel is a cylindrical piece of wood or metal, wherein the cylindrical piece of wood or metal is used to spin the spinner.

9. The painting apparatus of claim 1, further comprising two cup-holder hooks with standardized spacing there between to prevent slippage of the object while on the hanger.

10. The painting apparatus of claim 1, wherein each single-pole joint includes a joint base and a cylindrical support in addition to the single pole, wherein the single pole and the cylindrical support are attached to the joint base.

* * * * *